United States Patent [19]

Sumal

[11] Patent Number: 4,891,978
[45] Date of Patent: Jan. 9, 1990

[54] APPARATUS FOR MEASURING THE MASS OF A FLOWING MEDIUM AND METHOD FOR PRODUCING AN APPARATUS FOR MEASURING THE MASS OF A FLOWING MEDIUM

[75] Inventor: Jaihind S. Sumal, Vaihingen-Ensingen, Fed. Rep. of Germany

[73] Assignee: Robert Bosch GmbH, Stuttgart, Fed. Rep. of Germany

[21] Appl. No.: 307,724

[22] Filed: Feb. 8, 1989

Related U.S. Application Data

[62] Division of Ser. No. 585,093, Mar. 1, 1984, Pat. No. 4,826,328.

[30] Foreign Application Priority Data

Apr. 29, 1983 [DE] Fed. Rep. of Germany ....... 3315704

[51] Int. Cl.$^4$ .............................................. G01F 1/68
[52] U.S. Cl. .................................. 73/204.26; 73/118.2
[58] Field of Search ........... 73/204.25, 204.26, 204.27, 73/118.2

[56] References Cited

U.S. PATENT DOCUMENTS 4,213,335 7/1980 Peter et al. .................... 73/204.26 X
4,399,697 8/1983 Kohama et al. ............. 73/204.26 X Primary Examiner—Herbert Goldstein
Attorney, Agent, or Firm—Edwin E. Greigg

[57] ABSTRACT

An apparatus for measuring the mass of a flowing medium and a method for producing the apparatus. The apparatus includes a carrier, to which at least one resistor layer is applied. To calibrate the resistance value of the resistor layer, material can be removed in a calibration zone on the end of the resistor layer remote from the incident direction of flow. To this end, the resistor layer is connected with a current source furnishing a constant current. The temperature of the resistor layer is measured by means of a temperature measuring device and compared in an electronic device with a predetermined temperature, and the electronic device, upon a deviation of the measured temperature from the predetermined temperature triggers a material removing device for the removal of resistor material in the calibration zone (trimming zone).

4 Claims, 2 Drawing Sheets

APPARATUS FOR MEASURING THE MASS OF A FLOWING MEDIUM AND METHOD FOR PRODUCING AN APPARATUS FOR MEASURING THE MASS OF A FLOWING MEDIUM

This application is a division of application Ser. No. 585,093, filed Mar. 1, 1984, now U.S. Pat. No. 4,826,328.

BACKGROUND OF THE INVENTION

The invention is based on an apparatus and method of making an apparatus for measuring the mass of a flowing medium. In apparatus of this kind, that is, in so-called hot films, it is necessary for the temperature-dependent resistor layer or film to have a predetermined resistance value. In particular in the case of resistor films connected in series and disposed on both sides of the carrier, the resistance values must be as nearly identical as possible and must react with equal speed to changes in the flow speed of the medium.

OBJECT AND SUMMARY OF THE INVENTION

The apparatus and method according to the invention have the advantage that in a simple manner, while affecting the measuring sensitivity of the apparatus, a predetermined resistance value of the temperature-dependent resistor layer or layers is attainable.

The invention will be better understood and further objects and advantages thereof will become more apparent from the ensuing detailed description of a preferred embodiment taken in conjunction with the drawing.

DESCRIPTION OF THE PREFERRED EMBODIMENT

Figure 1:
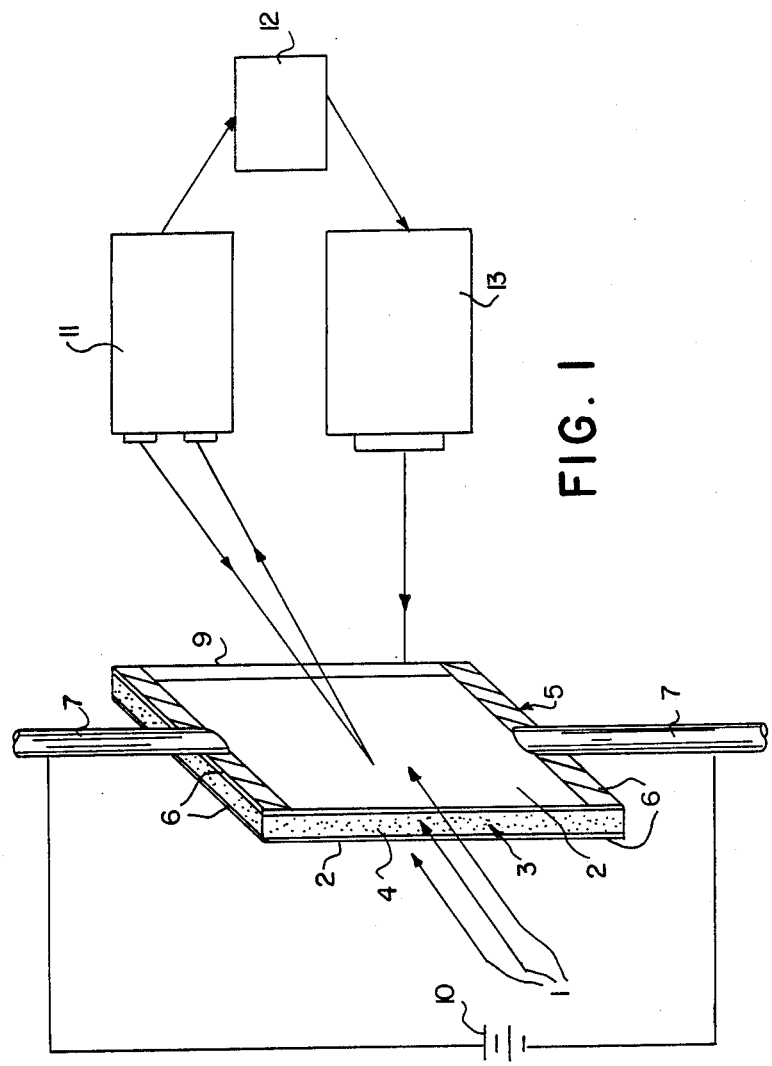
FIG. 1 shows an exemplary embodiment of the invention in simplified form.

In the drawing, in a flow of a medium identified by reference numeral 1, for instance the aspirated air in the intake tube of an internal combustion engine, at least one temperature-dependent resistor 2 is disposed in the form of a film or layer applied to at least one side of a plate-like carrier 3 which is for example fabricated of ceramic material and is electrically insulating; the resistor 2 serves to measure the mass of the flowing medium. To this end, the temperature-dependent resistor 2 is supplied with current in a known manner by an electronic regulating circuit, not shown, such that it assumes a constant temperature such as set forth in U.S. Pat. Nos. 4,213,335 and 4,304,130. When an apparatus of this kind is used to measure the aspirated air of an internal combustion engine, very high demands are made on the apparatus in terms of the speed and precision of measurement, because under rapidly changing quantities of aspirated air these changes in the air mass must be ascertained as rapidly as possible, so as to adapt the quantity of fuel to be supplied accordingly. As shown, the carrier 3 has an end face 4 opposing the direction of flow 1 and extends in the flow direction with side faces 5 parallel with the flow direction. Along these side faces 5, either one resistor layer 2 may be applied to only one side face or a resistor layer 2 may be applied to each of the side faces 5, and the two resistor layers 2 disposed on the side faces 5 oriented away from one another may be connected electrically with one another either in series or in parallel. The resistor layer 2 may for example be of platinum. Electrically conductive connecting layers 6 may likewise be applied to the side faces 5, being connected in an electrically conductive manner with the resistor layer 2, and from which connection wires 7 lead to the electronic regulating circuit, not shown. In order to attain a predetermined resistance value for the resistor layer or layers 2, material is removed from each resistor layer 2 until the desired resistance value is attained. In accordance with the invention, this removal of material for correcting the resistance value of the resistor layer 2 may be accomplished in a calibration zone (trimming zone) 9, which is disposed on the end remote from the direction of flow, that is, on the end remote from the end face 4 of the carrier 3. The resultant advantage is that the removal of material is effected in a zone of the resistor layer 2 which is as remote as possible from the end of the resistor layer 2 opposing the flow direction and has the least possible influence on the measuring sensitivity of the resistor layer 2, because the measuring sensitivity of the resistor layer 2 decreases in the direction of the flow as a result of separations of the flow from the surface of the resistor layer 2 that occur and as a result of the air's becoming warmer.

The trimming of each resistor layer 2 to a predetermined resistance value may be accomplished in an area remote from the normal use in a flow medium. The connection wires 7 are connected to a source of electric current 10 that supplies a constant current, as a result of which each resistor layer 2 is heated to a temperature which is measured by means of a temperature measuring device 11, which may for example be an optical pyrometer. The temperature ascertained by the temperature measuring device 11 is converted into an electrical signal and fed to an electronic device 12 in which the total temperature signal is compared with a temperature value prespecified for a particular resistance value of the resistance layer 2 and which upon a deviation of the measured temperature value from the predetermined temperature value triggers a material removing device 13 such that resistor material is removed from the calibration zone (trimming zone) 9 of the resistor layer 2 until the predetermined resistance value of the resistor layer 2 is attained. The removal of material may be accomplished by the material removing device 13 by means of a laser beam, for instance.

Figure 2:
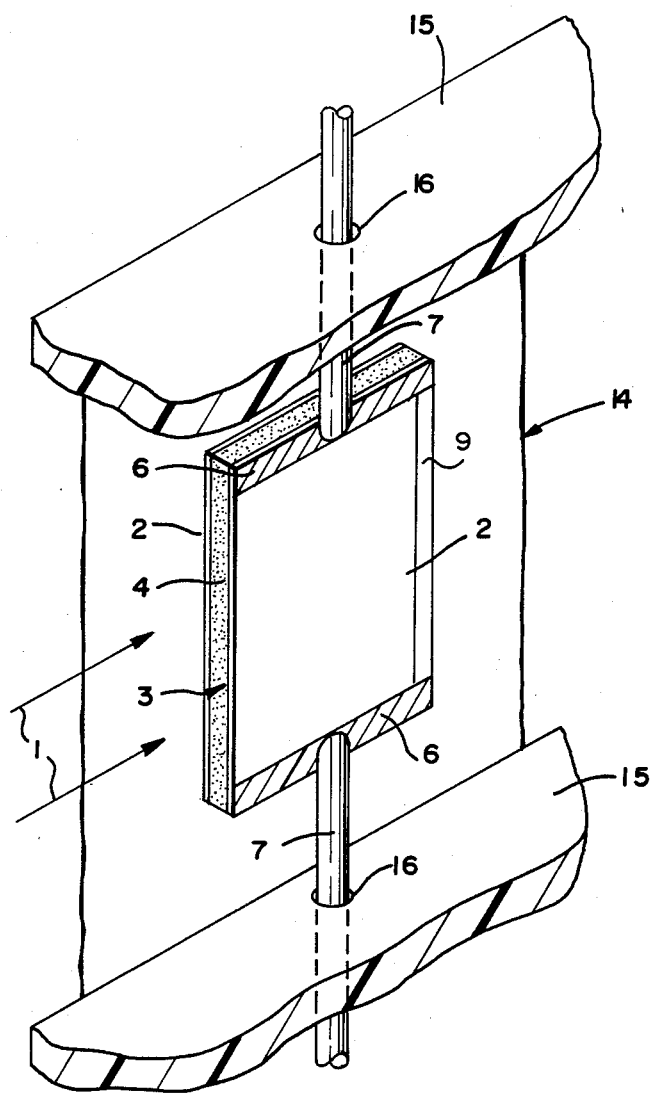
FIG. 2 illustrates a temperature-dependent resistor such as shown in FIG. 1 within an intake tube of an internal combustion engine.

FIG. 2 illustrates the apparatus formed by the method of FIG. 1 secured within an intake tube 14 of an internal combustion engine. The electrical leads 7 pass through the walls 15 of the intake tube, insulated therefrom by an insulator 16, and are connected to an electronic circuit, not shown, for indicating the temperature. The apparatus is secured such that the end 4 is positioned toward the direction from which the air flows.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A device for measuring the mass of a flow medium of an intake tube of an internal combustion engine, which comprises a substrate with parallel faces having a leading edge and a trailing edge, a resistor layer covering a major portion of at least one face of said substrate with said resistor layer extending from said leading edge toward said trailing edge, with a portion of said substrate extending along said trailing edge thereof free of said resistor layer, means for supporting said substrate in said intake tube with said trailing edge positioned down-stream in said flow medium.

2. A device as set forth in claim 1, in which said device includes a resistor layer formed on each side of said substrate with each face having corresponding resistor layer-free portions along one end of said substrate.

3. A method of positioning a device including a substrate with parallel faces having a leading edge and a trailing edge with a resistor layer covering a major portion of at least one face of said substrate, said resistor layer extending from said leading edge toward said trailing edge, with a resistor layer-free portion extending along said trailing edge of said substrate, which comprises positioning said substrate in an intake tube of an internal combustion engine for measuring a flow medium, positioning said substrate within said intake tube with said leading edge toward the direction from which said flow medium flows with said parallel faces parallel with a direction of a flow of said flow medium, and positioning said trailing edge of said substrate down-stream of the direction of flow of said flow medium.

4. A method as set forth in claim 3, in which said substrate includes a resistor layer on each of said parallel faces, with each parallel face having corresponding resistor layer-free portions along one end of said substrate.

* * * * *